United States Patent
Schroeder et al.

(10) Patent No.: US 10,820,509 B2
(45) Date of Patent: Nov. 3, 2020

(54) FOLDABLE CORN HEAD

(71) Applicant: CNH Industrial America LLC, New Holland, PA (US)

(72) Inventors: Jay D. Schroeder, Coal Valley, IL (US); John Bradley Lukac, St. John, IN (US); Frank R. G. Duquesne, Zwevegem (BE); Dan L. Garland, Solon, IA (US); Eric Shuman, Union Grove, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/671,782

(22) Filed: Aug. 8, 2017

(65) Prior Publication Data
US 2019/0045709 A1  Feb. 14, 2019

(51) Int. Cl.
*A01D 41/14* (2006.01)
*A01D 45/02* (2006.01)
(Continued)

(52) U.S. Cl.
CPC ......... *A01D 41/144* (2013.01); *A01D 45/021* (2013.01); *A01D 61/004* (2013.01); *A01D 69/002* (2013.01)

(58) Field of Classification Search
CPC ........ A01D 41/14; A01D 61/00; A01D 45/02; A01D 69/00; A01D 41/144; A01D 45/021; A01D 41/142; A01D 57/22
See application file for complete search history.

(56) References Cited

U.S. PATENT DOCUMENTS 4,227,366 A * 10/1980 Pucher ................ A01D 45/021
56/106
4,300,333 A * 11/1981 Anderson ........... A01D 61/008
198/666

(Continued)

FOREIGN PATENT DOCUMENTS

EP    1362504 A1    11/2003
EP    2446729 A1    5/2012
(Continued)

OTHER PUBLICATIONS

European Search Report for European Patent Application No. 18185996.8 dated Dec. 7, 2018 (6 pages).

*Primary Examiner* — Arpad Fabian-Kovacs
(74) *Attorney, Agent, or Firm* — Peter Zacharias; Patrick Sheldrake

(57) ABSTRACT

An agricultural vehicle including a chassis, at least one power take off member, and a folding header operably coupled to the agricultural vehicle and supported by the chassis. The folding header includes a center section operably coupled to the chassis of the agricultural vehicle. The center section includes a pair of lateral ends and at least one drive assembly operably coupled to the at least one power take off member of the agricultural vehicle. The folding header also includes at least one additional section pivotally coupled to one of the lateral ends of the center section and operably coupled to the at least one drive assembly. The at least one additional section is selectively pivotable between an operational position and a nonoperational position. The center section is configured to harvest a crop material in both of the operational position and nonoperational position of the at least one additional section.

16 Claims, 11 Drawing Sheets

(51) Int. Cl.
*A01D 69/00* (2006.01)
*A01D 61/00* (2006.01)

(56) References Cited

U.S. PATENT DOCUMENTS

| | | | |
|---|---|---|---|
| 4,409,780 A | 10/1983 | Beougher et al. | |
| 5,673,543 A * | 10/1997 | Richardson | A01D 41/144 56/228 |
| 5,724,798 A * | 3/1998 | Stefl | A01D 41/144 172/311 |
| 5,845,472 A * | 12/1998 | Arnold | A01D 41/144 56/94 |
| 7,043,889 B2 * | 5/2006 | Rauch | A01B 73/046 56/15.9 |
| 7,073,604 B1 * | 7/2006 | Dobson | A01B 63/32 111/57 |
| 7,234,291 B2 * | 6/2007 | Rickert | A01D 41/142 56/12.6 |
| 7,937,918 B1 | 5/2011 | Mossman | |
| 8,635,842 B2 * | 1/2014 | Markt | A01D 41/14 56/15.2 |
| 9,072,221 B2 | 7/2015 | Ritter et al. | |
| 9,173,345 B2 * | 11/2015 | Cressoni | A01D 45/021 |
| 9,198,353 B2 * | 12/2015 | Ritter | A01D 45/021 |
| 9,198,355 B2 * | 12/2015 | Heim | A01D 61/004 |
| 9,723,783 B2 * | 8/2017 | Patterson | A01D 41/1217 |
| 9,801,343 B2 * | 10/2017 | Markt | A01D 41/14 |
| 2003/0074876 A1 * | 4/2003 | Patterson | A01D 41/14 56/257 |
| 2003/0182912 A1 * | 10/2003 | Boll | A01D 34/661 56/14.7 |
| 2003/0226342 A1 * | 12/2003 | Boeckmann | A01D 41/144 56/14.7 |
| 2004/0123575 A1 * | 7/2004 | Rickert | A01D 41/144 56/14.7 |
| 2005/0109001 A1 * | 5/2005 | Wolters | A01D 43/082 56/16.4 R |
| 2008/0072560 A1 * | 3/2008 | Talbot | A01D 41/14 56/208 |
| 2008/0295473 A1 * | 12/2008 | Tippery | A01D 41/144 56/14.5 |
| 2014/0033670 A1 * | 2/2014 | Cressoni | A01D 41/144 56/104 |
| 2014/0066149 A1 * | 3/2014 | Dise | A01F 12/46 460/114 |
| 2014/0075906 A1 * | 3/2014 | Heim | A01D 61/004 56/105 |
| 2014/0075907 A1 * | 3/2014 | Ritter | A01D 45/021 56/105 |
| 2014/0075909 A1 * | 3/2014 | Bomleny | A01D 41/144 56/119 |
| 2016/0073585 A1 | 3/2016 | Cook et al. | |

FOREIGN PATENT DOCUMENTS

| | | |
|---|---|---|
| EP | 2695509 A1 | 2/2014 |
| EP | 2995188 A1 | 3/2016 |
| FR | 2 685 162 A1 | 6/1993 |
| WO | 20170120343 A1 | 7/2017 |

* cited by examiner

FOLDABLE CORN HEAD

FIELD OF THE INVENTION

The present invention relates to agricultural vehicles, and, more particularly, to agricultural vehicles which include a folding header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, and an unloading system, e.g., an unloading auger, on the combine is actuated to transfer the grain into the vehicle.

A typical header includes one or more cutters which cut the crop material that is harvested from the field. Once the crop material is cut, a conveyor system, which is positioned rearwardly of the cutter(s), catches the crop material and transports it to the feeder housing. Modern headers generally have cutters and attachments which are specifically optimized to harvest a particular kind of crop material.

In regards to harvesting corn, a header known as a "corn head" generally includes snouts, row units, a conveyor, and accompanying drive architecture to power the header. The snouts are conically shaped to pass in between the rows of corn, defining a designated passageway for the rows of corn to travel therein. The row units generally include gathering chains and stalk rolls, positioned beneath the gathering chains. Each row unit also includes respective gear boxes to drive the gathering chains and stalk rolls. Generally, the respective gear boxes are all driven by a single rotating cross shaft, which in turn is driven by the drives located at each lateral end of the header. A drive shaft, powered by the power take off (PTO) of the agricultural vehicle, generally extends outwardly across the rear of the header to connect to the drives at the lateral ends of the corn header. The conveyor is disposed aft of the row units and it may be in the form of a conveyor belt, an auger with a tubular shaft having left and right flighting, or a combination of both. As the agricultural vehicle traverses the field, the corn stalks are pulled inwardly by the gathering chains and downwardly by the stalk rolls. This motion causes the ears of corn to forcefully hit the base of the header and thereby snap off their respective stalk. The gathering chains additionally help to move the ears of corn inwardly toward the conveyor, which transports the ears of corn to the center of the header for entry into the feeder house. The stripped corn stalks are further pinched and crushed by the stalk rolls in order to accelerate the decomposition process of the stalks. The header may also include chopping units that have rotating blades located beneath the stalk rolls to chop the stalks, leaves, and other debris (also known as material other than grain "MOG") to more easily incorporate the remaining residue in subsequent tillage practices.

Large corn headers may be designed as folding corn headers that have wing sections which fold upwardly onto a rigid center section. The motivation for designing foldable corn headers stems from the balance between harvesting efficiency and transportation. To increase harvesting efficiency, it is generally better to increase the width of the corn header to harvest more crop material in a single pass. However, one of the issues associated with large corn headers is that the grain bin of the agricultural vehicle may become filled to its maximum capacity too quickly. For instance, when opening up a field or cutting new lands the grain tank may reach capacity before the agricultural vehicle can travel a certain distance to reach an unloading location. Hence, the grain tank capacity may limit the travel distance of the agricultural vehicle. This issue continues to proliferate as corn yields and header widths increase.

What is needed in the art is an agricultural harvester that allows an operator to vary the amount of crop material harvested by the header.

SUMMARY OF THE INVENTION

In accordance with an aspect of the present invention, there is provided a folding header that includes a center section and additional sections which are driven by the center section and fold into a nonoperational position such that the center section may harvest a crop material without the use of the additional sections.

In accordance with another aspect of the present invention, an agricultural vehicle includes a chassis, at least one power take off member, and a folding header operably coupled to the agricultural vehicle and supported by the chassis. The folding header includes a center section operably coupled to the chassis of the agricultural vehicle. The center section includes a pair of lateral ends and at least one drive assembly operably coupled to the at least one power take off member of the agricultural vehicle. The folding header also includes at least one additional section pivotally coupled to one of the lateral ends of the center section and operably coupled to the at least one drive assembly. The at least one additional section is selectively pivotable between an operational position and a nonoperational position. The center section is configured to harvest a crop material in both of the operational position and nonoperational position of the at least one additional section.

In accordance with yet another aspect of the present invention, a folding header for harvesting a crop material includes a center section having a pair of lateral ends and at least one drive assembly. The folding header also includes at least one additional section pivotally coupled to one of the lateral ends of the center section and operably coupled to the at least one drive assembly. The at least one additional section is selectively pivotable between an operational position and a nonoperational position. The center section is configured to harvest a crop material in both of the operational position and nonoperational position of the at least one additional section.

In accordance with still another aspect of the present invention, a method includes the steps of providing a folding header for harvesting a crop material. The folding header includes a center section having a pair of lateral ends and at least one drive assembly. The folding header also includes at least one additional section pivotally coupled to one of the lateral ends of the center section and operably coupled to the at least one drive assembly. The at least one additional section is selectively pivotable between an operational position and a nonoperational position. The center section is configured to harvest a crop material in both of the operational position and nonoperational position of the at least one additional section. The method includes the further steps of positioning the at least one additional section from the nonoperational position to the operational position to harvest a greater amount of the crop material, and positioning the at least one additional section from the operational position to the nonoperational position to harvest a lesser amount of the crop material.

An advantage of the agricultural harvester described herein is that an operator may selectively and easily choose to harvest a lesser or greater amount of crop material from a field.

Another advantage of the agricultural harvester described herein is that the agricultural harvester may traverse a greater distance across a field without reaching the maximum capacity of the grain tank in order to reach a desired location or open up a field.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
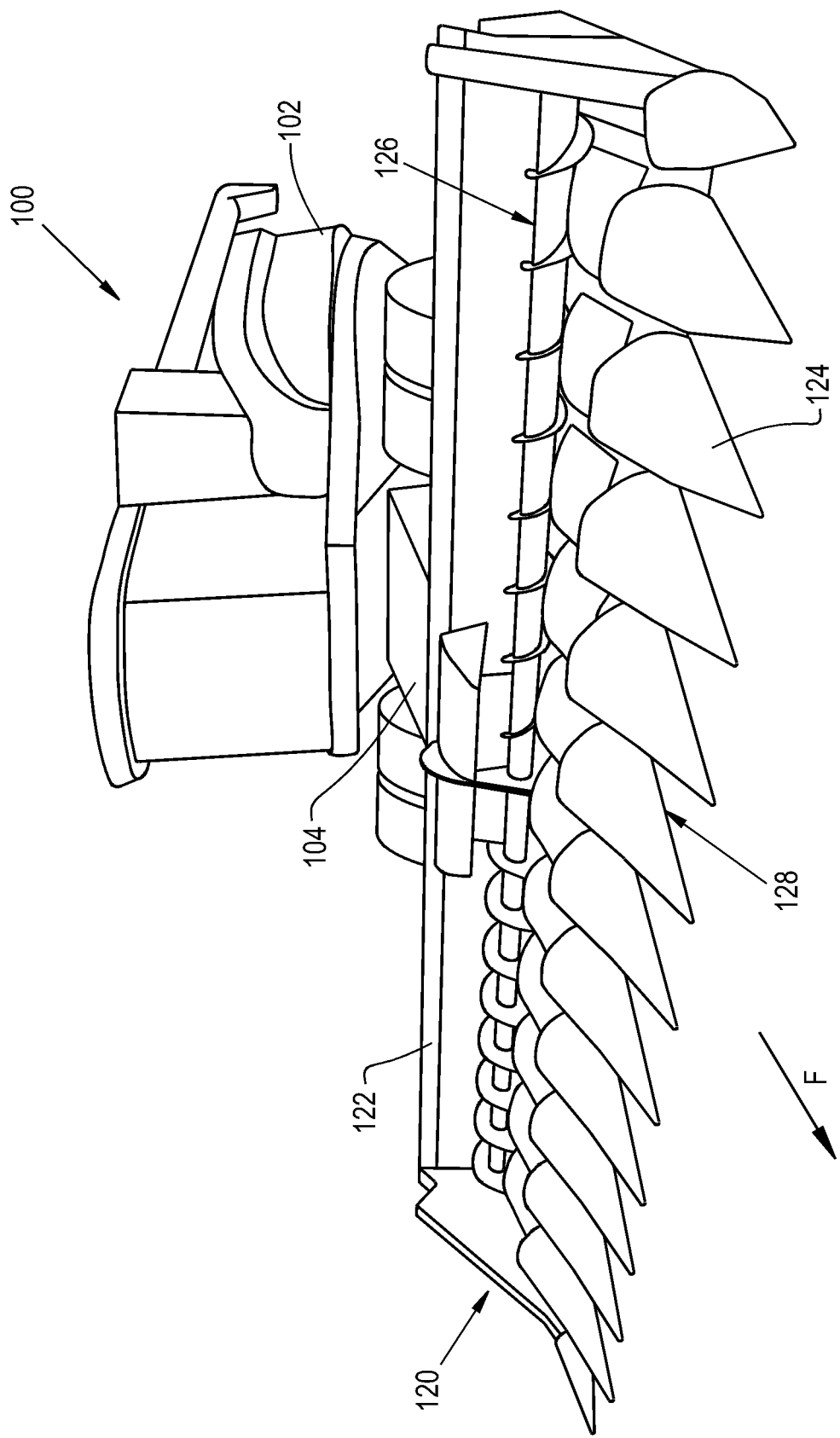
FIG. 1 is a perspective view of a known agricultural vehicle with a conventional header.

Referring now to the drawings, and more particularly to FIG. 1, there is shown a conventional agricultural vehicle 100 in the form of a combine harvester which generally includes a chassis 102, a feeder house 104, and a known corn header 120 carried by the chassis 102. The corn header 120 includes a frame 122, snouts 124, a conveyor 126, e.g. an auger, and row units 128. The snouts 124 in part define a crop receiving slot or gap therebetween. Each row unit 128 may include gathering chains and/or stalk rolls that are driven by respective gearboxes coupled to a single rotating cross shaft. The corn header 120 may also include choppers located underneath the stalk rolls of each row unit 128 that are driven by an additional rotating cross shaft. The cross shafts may in turn be driven by the PTO of the agricultural vehicle 100 via respective drivelines that extend to the lateral ends of the corn header 120. As the agricultural vehicle 100 traverses a field in a forward direction, denoted by arrow "F", the corn stalks are cut from the field and the ears of corn are stripped from the stalks by the motion of the gathering chains and stalk rolls. The ears of corn are then gathered by the conveyor 126 and are transported to the center of the header 120 for entry into the feeder house 104 and subsequent processing through the agricultural vehicle 100. The stalks and the remaining MOG are pulled down by the stalk rolls and may be chopped into smaller pieces by the chopper.

Referring now to FIGS. 2-7, there is shown a folding header 200 according to an exemplary embodiment of the present invention. The folding header 200 may be operably coupled to an agricultural vehicle 100. The agricultural vehicle 100 may be in the form of a combine harvester which generally includes a chassis that supports the folding header 200, a PTO, and additional internal systems for the separation and handling of collected crop material. However, these additional systems are omitted from view for brevity of description. It should be appreciated that the folding header 200 described and illustrated herein does not necessarily need to be included on combine harvesters, but can be incorporated in other agricultural vehicles.

The folding header 200 generally includes a center section 210 and at least one additional section, for example two additional sections 220A and 220B, which are pivotally and operably coupled to the center section 210 at joints 202A, 202B. The folding header 200 is shown to be in the form of a folding corn header and the sections 210, 220A, 220B may each respectively include snouts 211, 221A, 221B, row units 212, 222A, 222B, and/or a conveyor 213, 223A, 223B, e.g. an auger. For example, the center section 210 may have 6-8 rows and the additional sections 220A, 220B may have 2-4 rows for harvesting corn.

The center section 210 is operably coupled to the chassis of the agricultural vehicle 100. The center section 210 includes a pair of lateral ends 214A, 214B and a drive assembly 230 for driving the row units 212, 222A, 222B. The center section 210 may also include an actuating assembly 215, which may include one or more lift actuator(s) 216, for pivoting one or both of the additional sections 220A, 220B upwardly. The lift actuators 216 may be in the form of hydraulic cylinders 216 that are pivotally connected to the additional sections 220A, 220B by mounts 217. It should be appreciated that the actuating assembly 215 may also include various hydraulic and/or electrical lines which are operably coupled to the agricultural vehicle 100 to pivot the additional sections 220A, 220B.

The center conveyor 213, which may be in the form of an auger, may be driven by one or more actuators 218. The actuator(s) 218 may be in the form of a hydraulic or electric motor which is mounted to the center section 210 such that the center conveyor 213 drives the conveyors 223A, 223B of the additional sections 220A, 220B. For example, as shown in detail in FIG. 6, the center section 210 may include a single actuator 218 in the form of a drive sprocket 218 with an accompanying chain to rotate a gearwheel operably coupled to the center conveyor 213 in order to drive the center conveyor 213 (the chain and chain guard are not shown).

Figure 7:
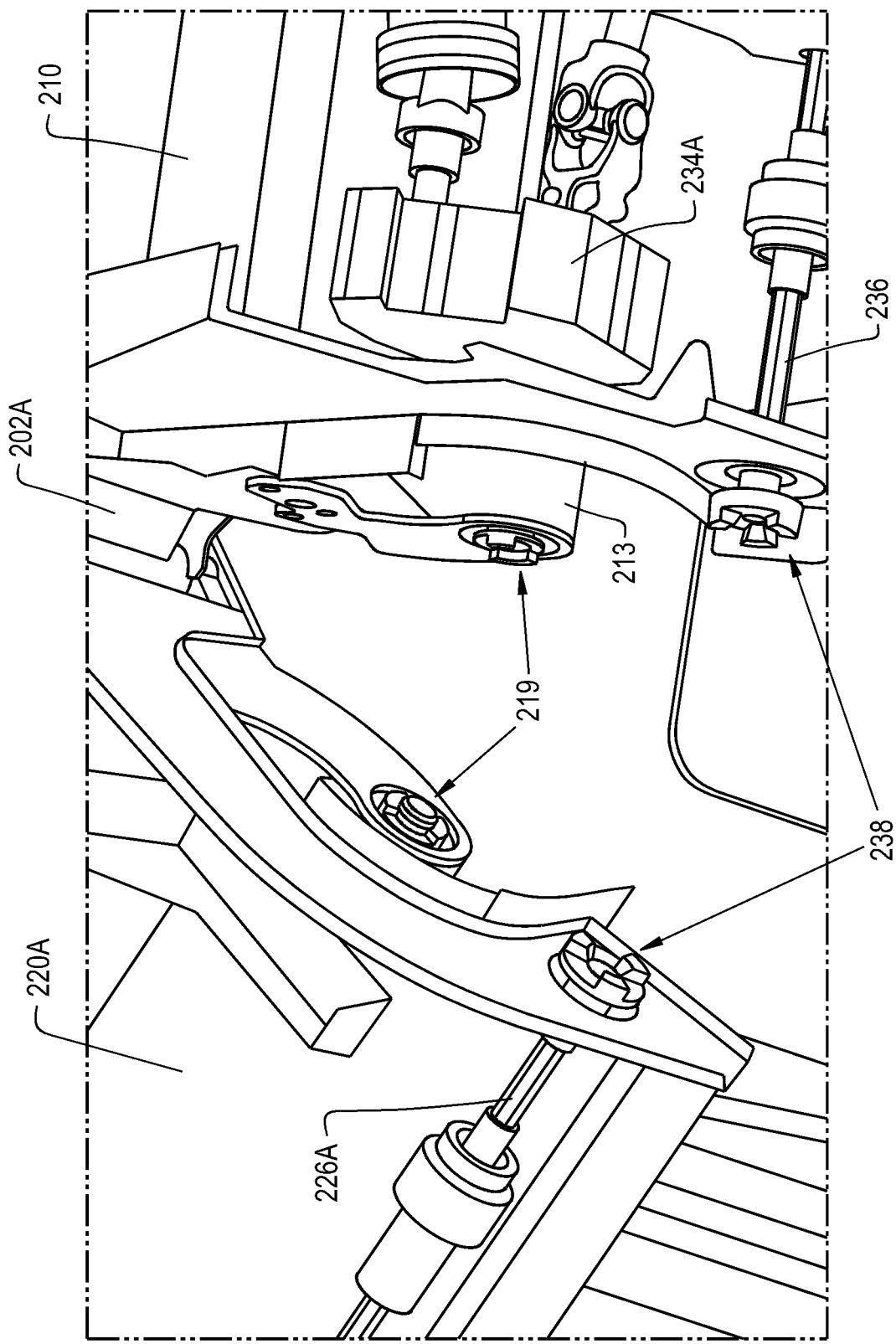
FIG. 7 is a perspective view illustrating a connection between the center section and the additional section in accordance with an exemplary embodiment of the present invention.
Figure 8:
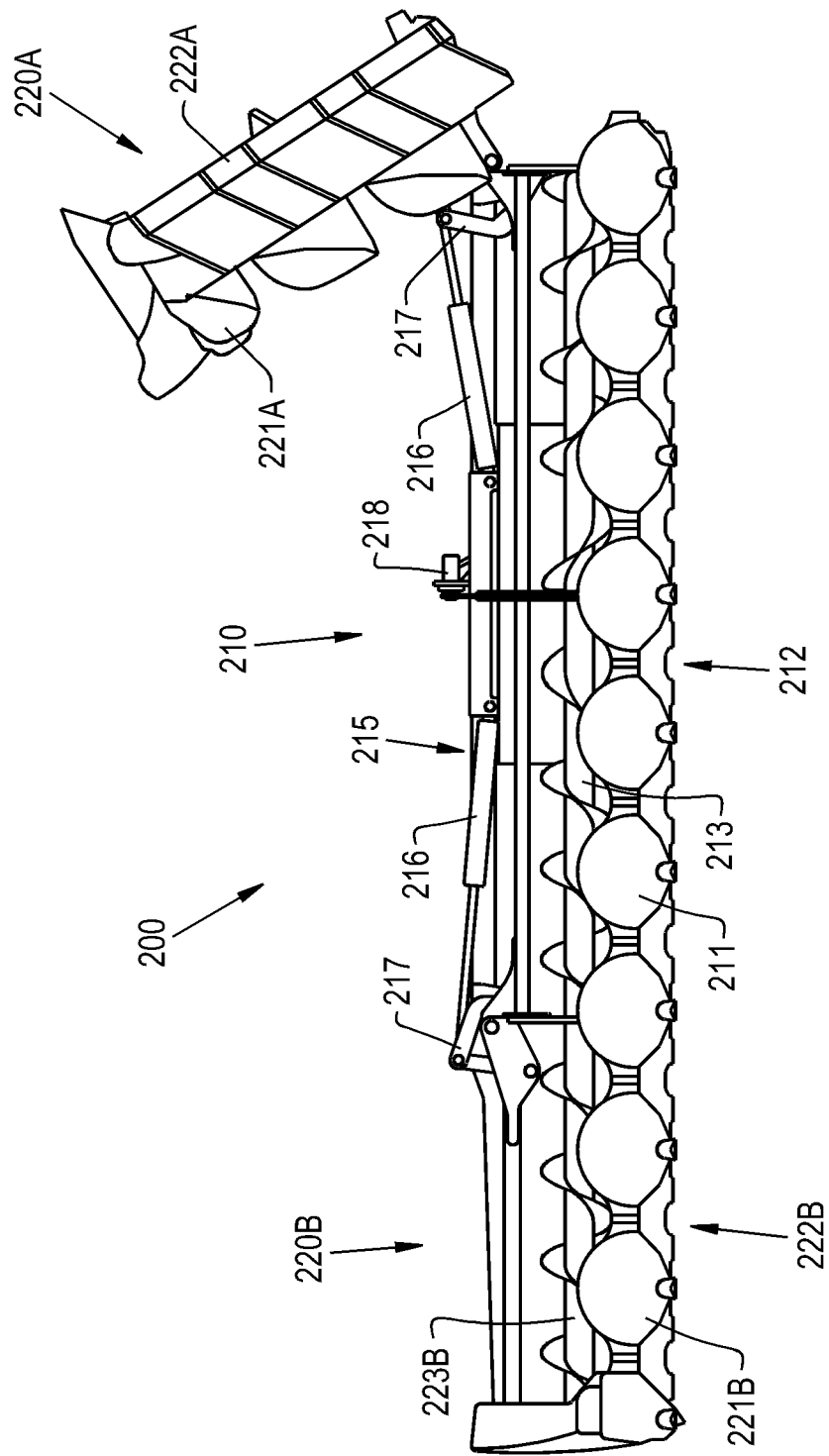
FIG. 8 is a front view of the folding corn header in a partial harvesting position in accordance with an exemplary embodiment of the present invention.
Figure 9:
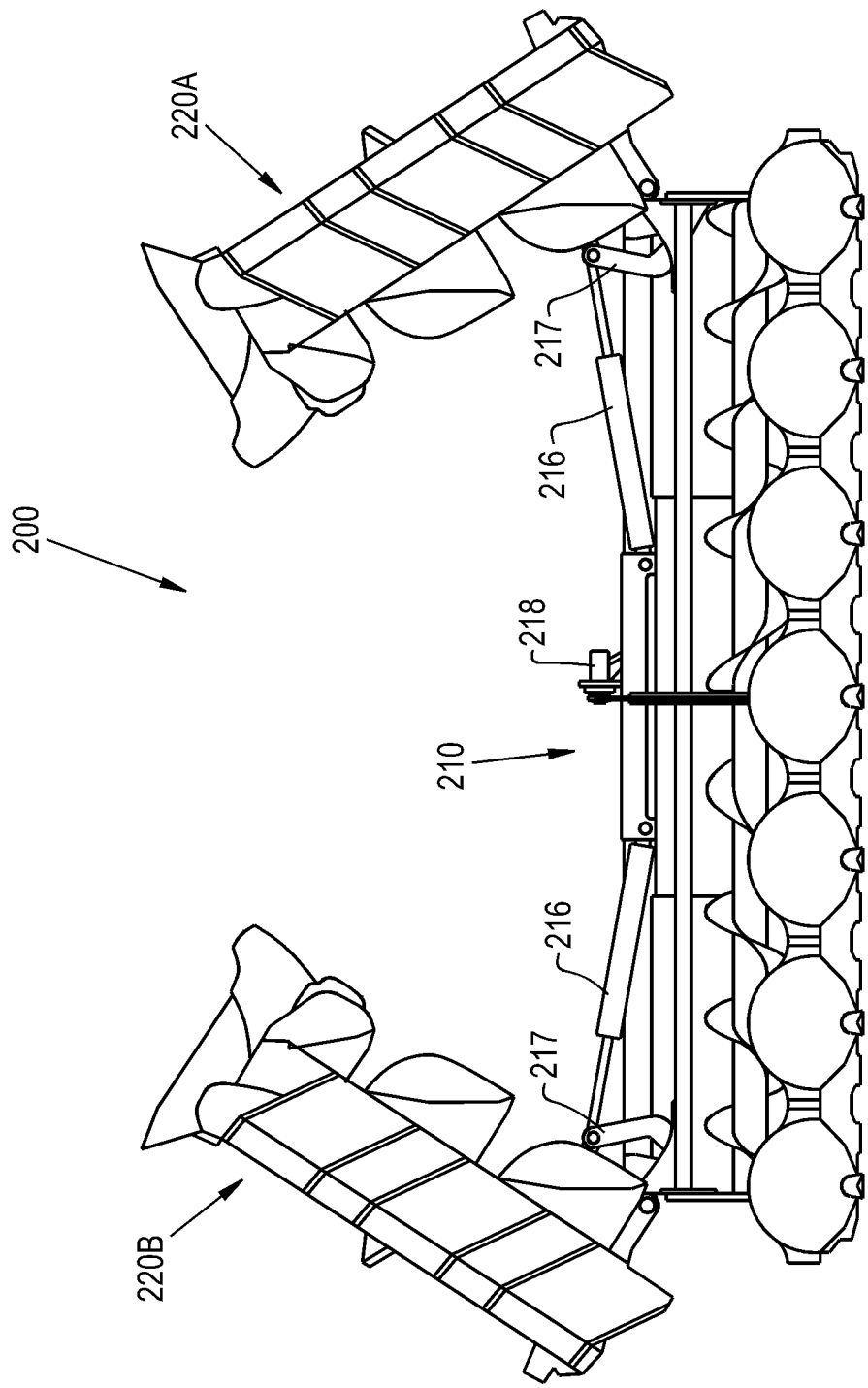
FIG. 9 is a front view of the folding corn header in another partial harvesting position in accordance with an exemplary embodiment of the present invention.

The center conveyor 213 may selectively couple with the conveyors 223A, 223B of the additional sections 220A, 220B via self-engaging and corresponding end couplers 219 affixed to the mating ends of the conveyors 213, 223A, 223B (FIG. 7). The end couplers 219 are configured to translate the rotational motion of the center conveyor 213 to the additional conveyors 223A, 223B. In this regard, as the hydraulic cylinders 216 lift a respective additional section 220A, 220B the couplers 219 disengage and the additional conveyor 223A, 223B of the lifted additional section 220A, 220B is no longer in an operational state.

Figure 2:
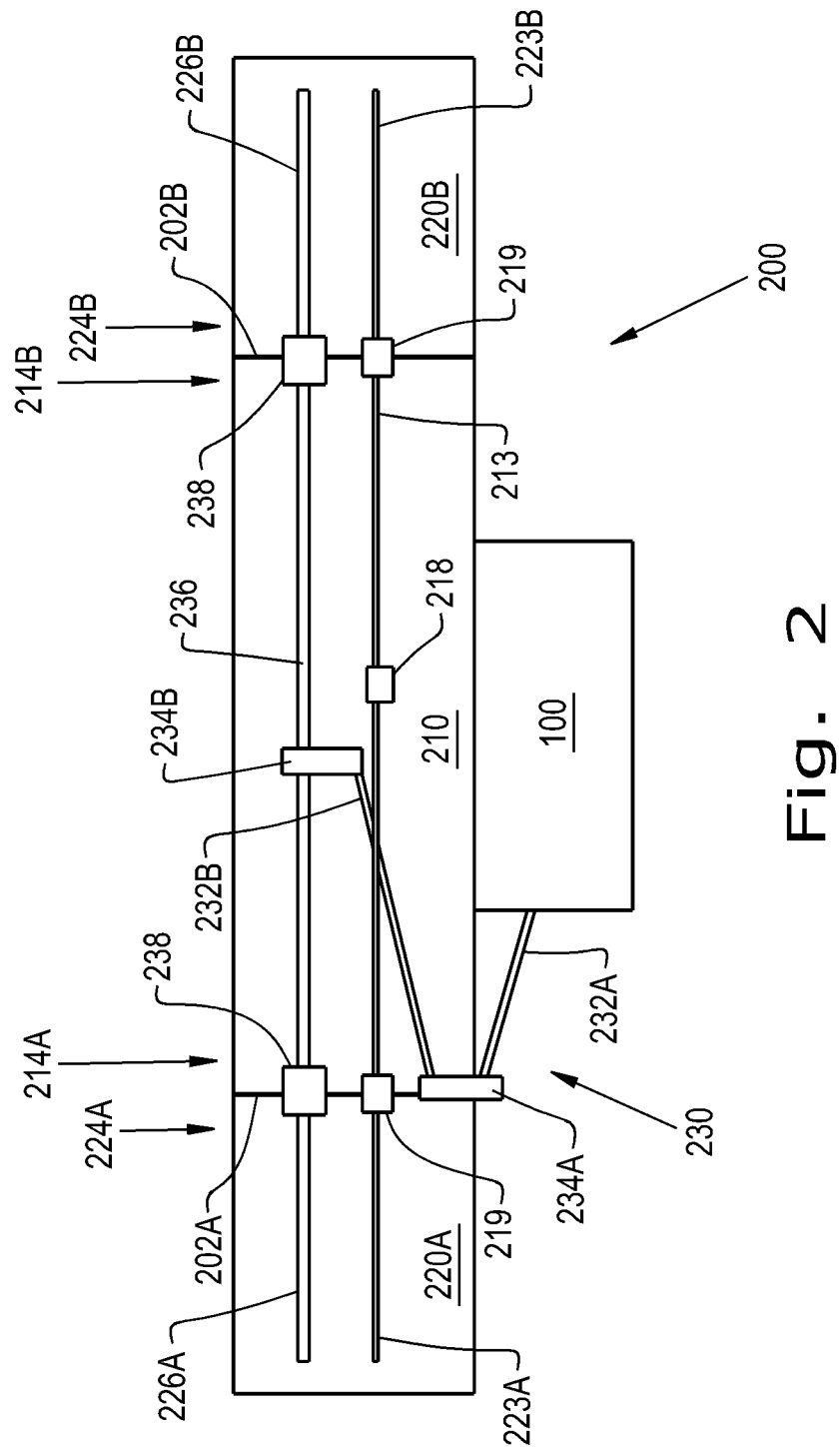
FIG. 2 is a schematic representation of an agricultural vehicle with a folding header in accordance with an exemplary embodiment of the present invention.
Figure 3:
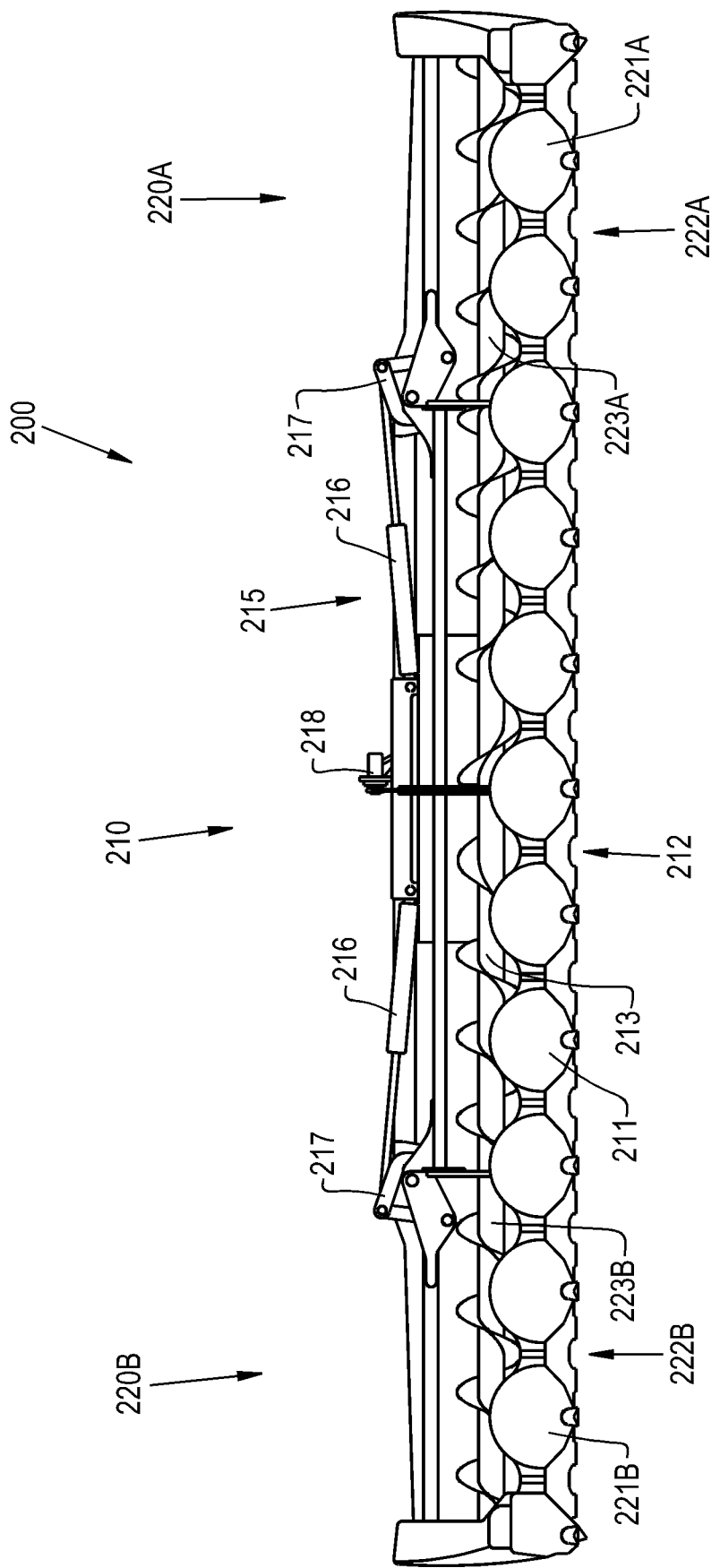
FIG. 3 is a front view of a folding corn header in accordance with an exemplary embodiment of the present invention.
Figure 5:
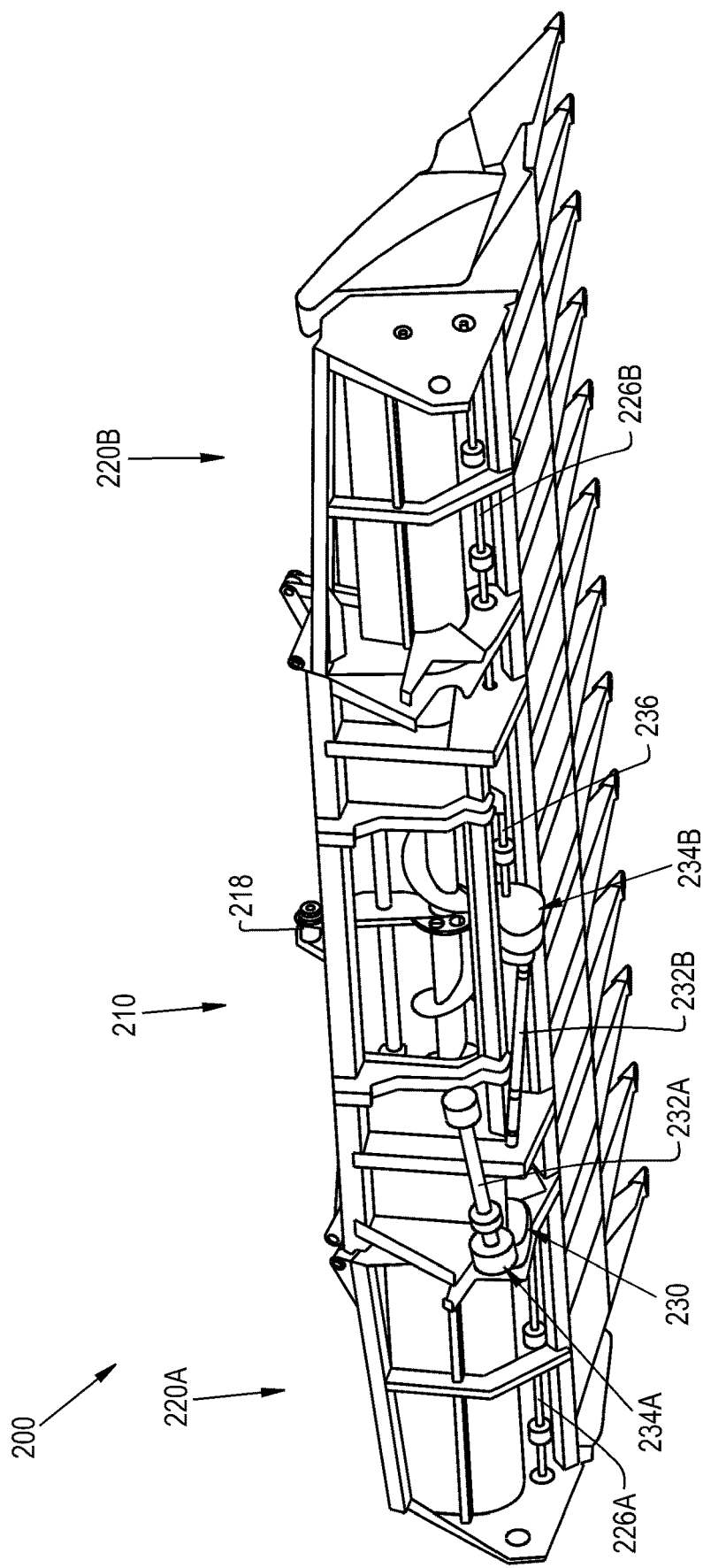
FIG. 5 is a rear perspective view of the folding corn header in accordance with an exemplary embodiment of the present invention.
Figure 6:
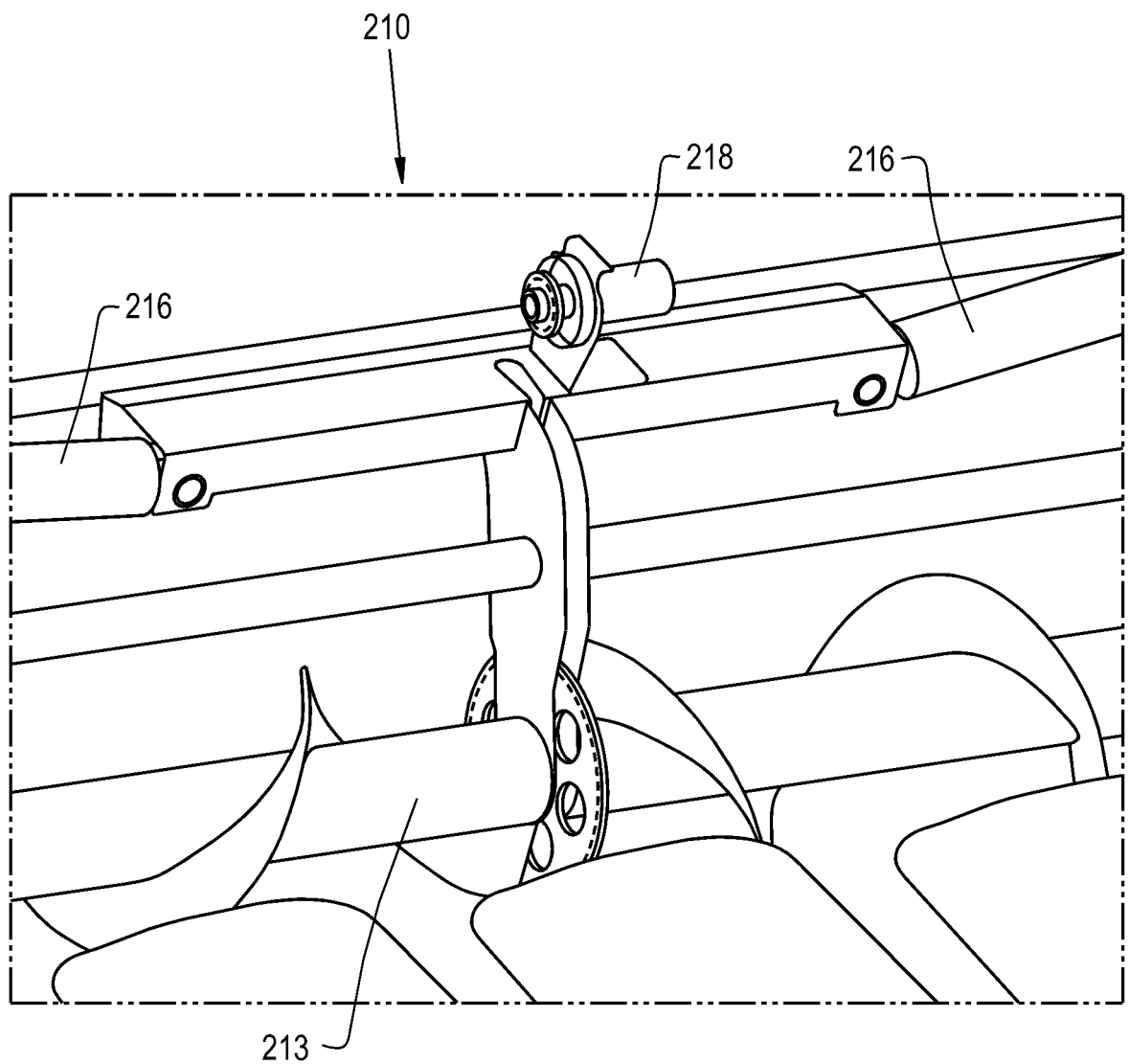
FIG. 6 is a perspective view illustrating an actuator that drives the center conveyor in accordance with an exemplary embodiment of the present invention.

Referring now specifically to FIGS. 2 and 5, there is shown the drive assembly 230 in more detail. The drive assembly 230 is operably coupled to the PTO of the agricultural vehicle 100. The drive assembly 230 includes first and second drive lines 232A, 232B, first and second transmissions 234A, 234B respectively coupled to the first and second drive lines 232A, 232B, and a rotating cross shaft 236. The transmissions 234A, 234B may be in the form of gearboxes, continuously variable transmissions, chain cases, or any combination thereof. The connections between the transmissions 234A, 234B and the respective drive lines 232A, 232B may be in the form of universal joints or the like.

The first drive line 232A is operably coupled to the PTO of the agricultural vehicle 100, and the first drive line 232A extends outward to couple to the first, intermediate transmission 234A. The first transmission 234A is located at a lateral end, for example end 214A, of the center section 210. The second drive line 232B is operably coupled to the first transmission 234A and extends forwardly and inwardly to the bottom center of the center section 210 to couple to the second transmission 234B. The second transmission 234B is located in between the lateral ends 214A, 214B of the center section 210 such that it is approximately located in a middle region of both the center section 210 and the cross shaft 236. The second transmission 234B is operably coupled to the cross shaft 236, which in turn drives the row units of the center section 210.

The additional sections 220A, 220B each have a respective inboard end 224A, 224B and a distal end. The inboard ends 224A, 224B of the additional sections 220A, 220B are pivotally coupled to the lateral ends 214A, 214B of the center section 210 at joints 202A, 202B. The additional sections 220A, 220B may also include a respective cross shaft 226A, 226B for driving their respective row units 222A, 222B. The respective connections of the cross shafts 226A, 226B and the center cross shaft 236 may each include self-engaging end couplers 238, which selectively engage and disengage with another such that the rotational movement of the cross shaft 236 may or may not be translated to the cross shafts 226A, 226B (FIG. 7). Hence, the respective conveyors 223A, 223B and the cross shafts 226A, 226B of the additional sections 220A, 220B are removably coupled to the center conveyor 213 and cross shaft 236 of the center section 210, respectively. Thereby, the drive assembly 230 and actuator(s) 218 of the center section 210 drive the row units 222A, 222B and the conveyors 223A, 223B of the additional sections 220A, 220B.

Figure 4:
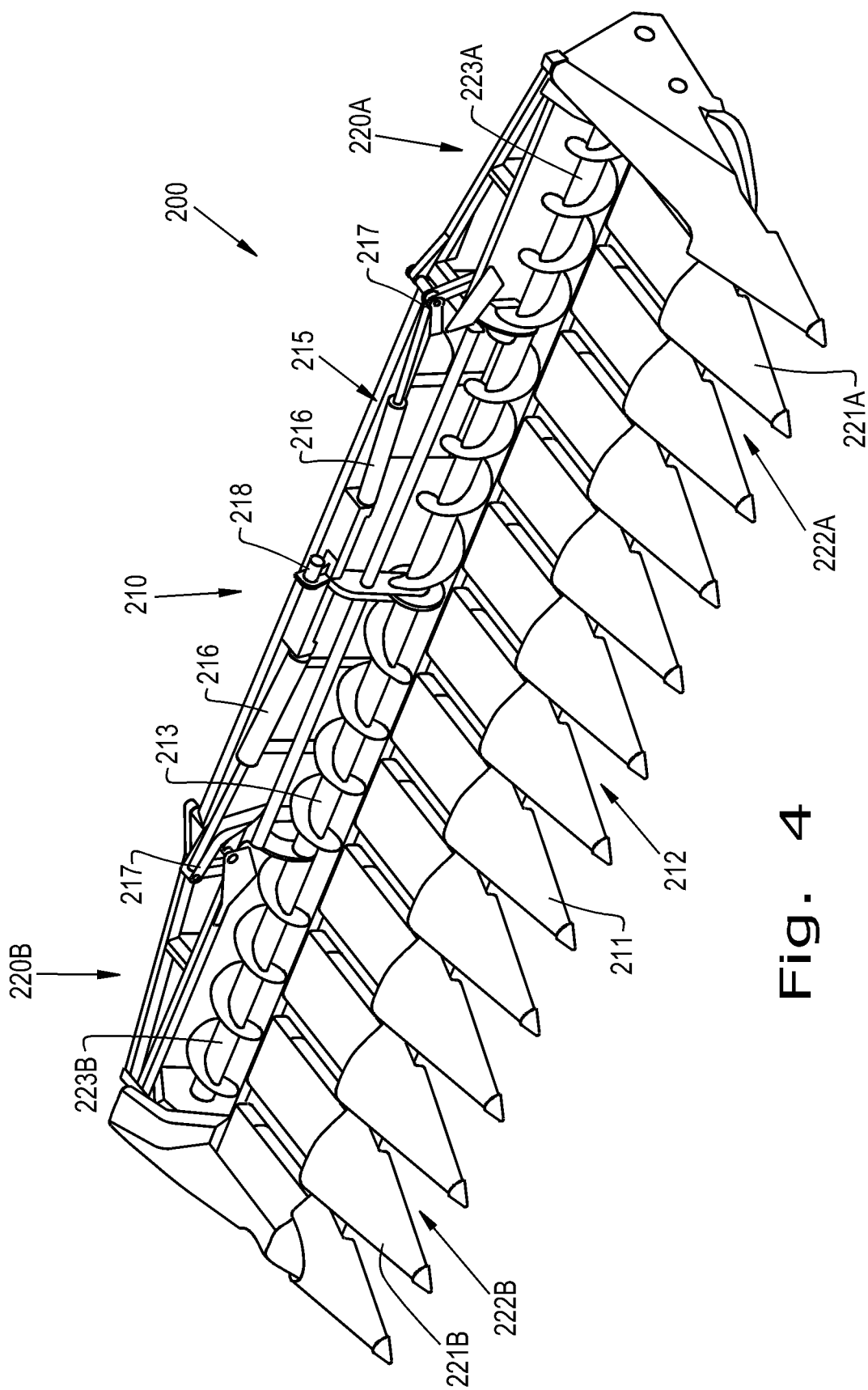
FIG. 4 is a front perspective view of the folding corn header in accordance with an exemplary embodiment of the present invention.
Figure 10:
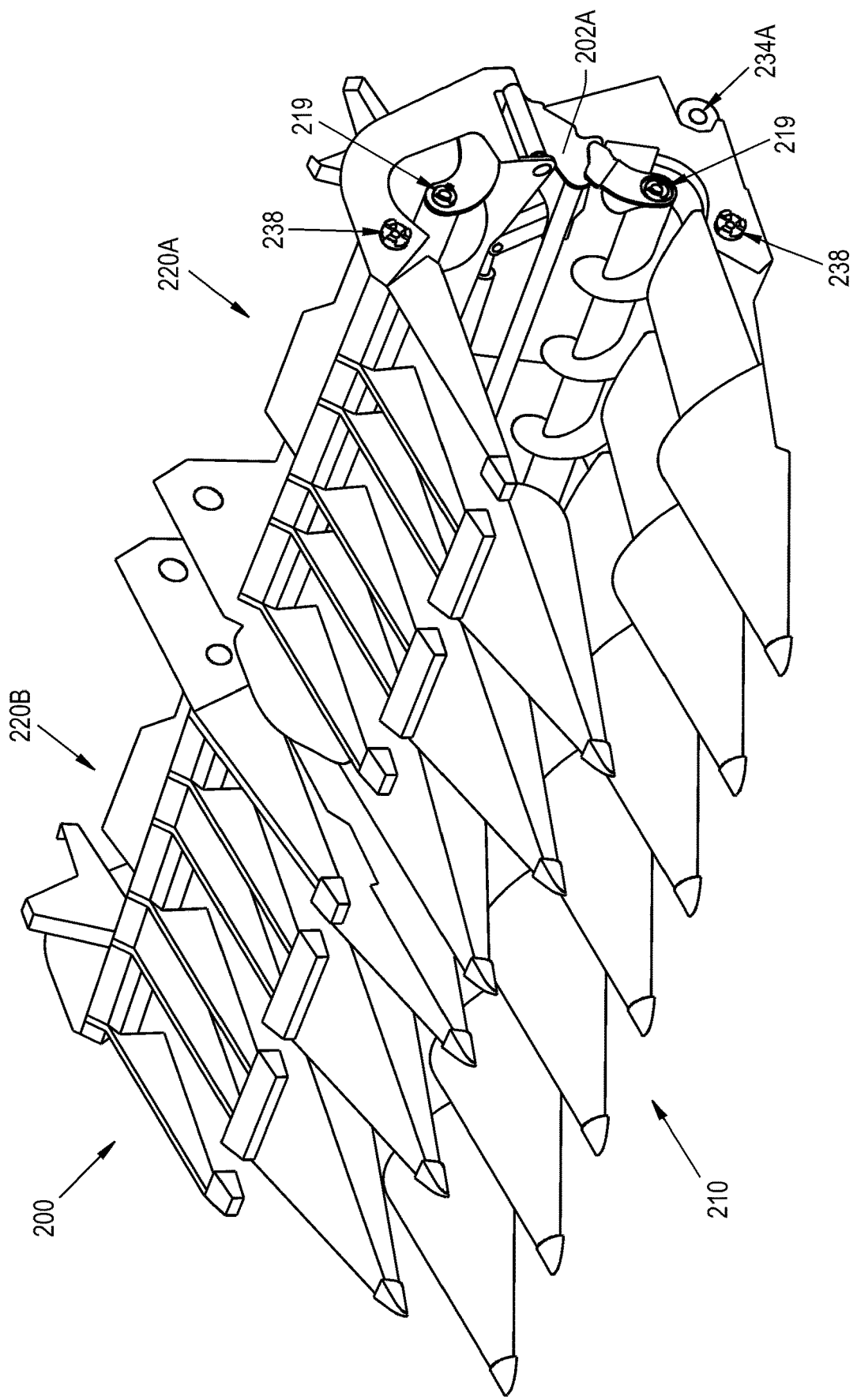
FIG. 10 is a perspective view of the folding corn header in a folded position in accordance with an exemplary embodiment of the present invention.

Referring now collectively to FIGS. 4 and 8-10, there is shown the folding header 200 throughout several different complete harvesting and partial harvesting positions as a result of selectively pivoting the additional sections 220A, 220B between an operational position and a nonoperational position. FIG. 4 illustrates the complete harvesting position in which both of the additional sections 220A, 220B are driven by the center section 210. The folding header 200 may also be operated in a partial operating state such that one (FIG. 8) or both of the additional sections 220A, 220B (FIG. 9) are in a nonoperational position. In other words, the center section 210 may continue to harvest a crop material as one or both of the additional sections 220A, 220B are pivoted upwardly out of the way of the unharvested crop material as well as clear from obstructing the line of sight of the operator. Additionally, the folding header 200 may be folded in a transport position (FIG. 10).

The center section 210 can harvest the crop material when one or both additional sections 220A, 220B are in the nonoperational position, as the row units 222A, 222B and conveyors 213, 223A, 223B of each section 210, 220A, 220B are driven from the center section 210. The center cross shaft 236 may continually be driven by the drive assembly 230 as one or both of the cross shafts 226A, 226B respectively engage and disengage with the center cross shaft 236 in the operational position and nonoperational position. In this regard, an operator may selectively choose to harvest a lesser or greater amount of crop material by positioning the additional sections 220A, 220B in the nonoperational position or by positioning the additional sections 220A, 220B in the operational position to use the sections 210, 220A, 220B in conjunction with each other. Thereby, an operator can regulate how much crop material is harvested in order to traverse a greater distance across the field without reaching the maximum capacity of the grain tank of the agricultural vehicle 100.

In operation, the folding header 200 may initially be transported to a field in the transport position (FIG. 10). Then, an operator may position one or both of the additional sections 220A, 220B in the operational position of the additional section(s) 220A, 220B. For example, the folding header 200 may be positioned in the complete harvesting position such that both of the additional sections 220A, 220B are in their operational positions and are driven by the center section 210. In the operational position of the additional section(s) 220A, 220B a greater amount of crop material may be harvested by the folding header 200, comparatively to the nonoperational position. An operator may then position the folding header 200 in the partial harvesting position such that one or both of the additional section(s) 220A, 220B are positioned in their respective nonoperational position to harvest a lesser amount of crop material.

As shown, the nonoperational position may be a partially lifted position in which one or both of the additional sections 220A, 220B are folded upwardly and substantially above the center section 210. However, the nonoperational position may include any position in which the additional sections 220A, 220B are not engaged with the center section 210, i.e., the respective end couplers 219, 238 are disengaged. For example, the nonoperational position may include a partially folded position in which one or both of the additional sections 220A, 220B are folded upward 15°, 30°, 90°, or 120° relative to the horizontal plane of the center section 210. The nonoperational position may further include any position in which the additional sections 220A, 220B do not harvest or otherwise interfere with the standing, unharvested rows of crop material.

Figure 11:
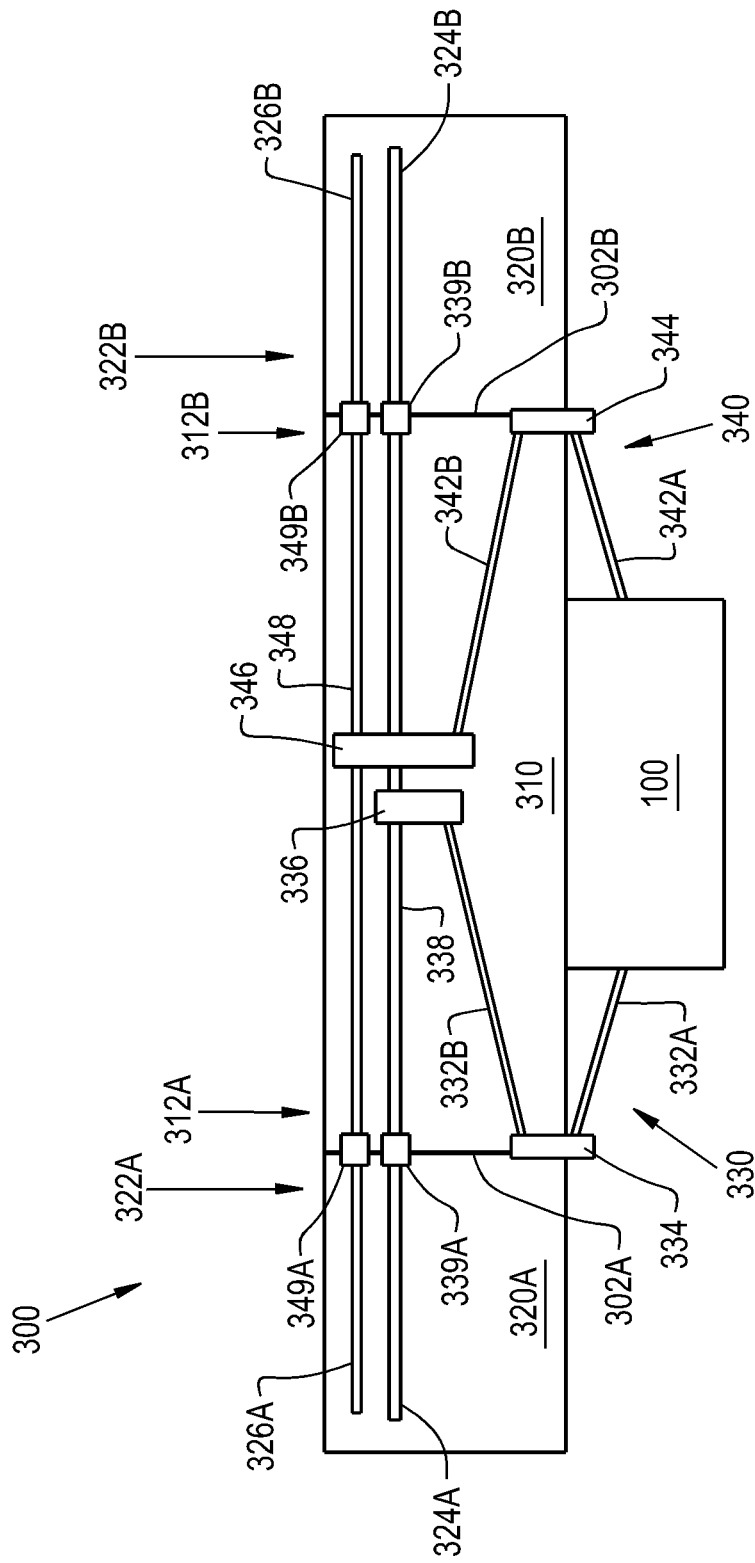
FIG. 11 is a schematic representation of an agricultural vehicle with a folding header including a chopper in accordance with another exemplary embodiment of the present invention.

Referring now to FIG. 11, there is shown a schematic illustration of a folding header 300 according to an exemplary embodiment of the present invention. The folding header 300 may be substantially similar to the folding header 200 except that the folding header 300 may include the addition of choppers in order to further facilitate the incorporation of the remaining MOG in subsequent tillage practices. The folding header 300 may be operably coupled to an agricultural vehicle 100 and supported by its chassis as discussed above.

The folding header 300 generally includes a center section 310 and at least one additional section, for example two additional sections 320A and 320B, which are pivotally and operably coupled to the center section 310 at pivot joints 302A, 302B. As shown, the folding header 300 is in the form of a folding corn header, such that the sections 310, 320A, 320B may each include snouts, row units, choppers and/or a respective conveyor, e.g. an auger.

The center section 310 may include a pair of lateral ends 312A, 312B and two drive assemblies 330, 340 for respectively driving the row units and choppers. As discussed above, the center section 310 may also include an actuating system and an actuator for respectively pivoting the additional sections 320A, 320B and driving the respective conveyors.

The drive assemblies 330, 340 of the center section 310 are each operably coupled to the PTO of the agricultural vehicle 100. The drive assemblies 330, 340 each include respective first and second drive lines 332A, 332B and 342A, 342B, first and second transmissions 334, 336 and 344, 346, and a rotating cross shaft 338, 348. The drive assemblies 330, 340 may be in a similar form and operate as the drive assembly 230 of the folding header 200 described above. Thereby, the first and second drive assemblies 330, 340 can respectively drive the row units and choppers of the center section 310.

The additional sections 320A, 320B each have a respective inboard end 322A, 322B and a distal end. The inboard ends 322A, 322B of the additional sections 320A, 320B are pivotally coupled to the lateral ends 312A, 312B of the center section 310 at pivot joints 302A, 302B. The additional sections 320A, 320B may also each include cross shafts 324A, 324B and 326A, 326B for respectively driving the row units and choppers. The respective cross shafts 324A, 324B and 326A, 326B of the additional sections 320A, 320B are removably coupled to the cross shafts 338 and 348 of the center section 310 via self-engaging drive couplers 339A, 339B and 349A, 349B as described above. Thus, the center section 310 drives the respective row units, choppers, and conveyors of the additional sections 320A, 320B through its drive assemblies 330, 340 and actuator(s).

Similarly to the folding header 200 as described above, the additional sections 320A, 320B of the folding header 300 may selectively and individually pivot between an operational position and a nonoperational position. In this regard, an operator may selectively choose to harvest a greater amount of crop material by using the sections 310, 320A, 320B in conjunction, or may choose to harvest a lesser amount of crop material by placing one or both of the additional sections 320A, 320B in the nonoperational position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
a chassis;
at least one power take off member;
a folding header operably coupled to the chassis of the agricultural vehicle and supported by the chassis, the folding header including:
a center section operably coupled to the chassis of the agricultural vehicle, the center section including:
a pair of lateral ends;
a center conveyor and an actuator driving the center conveyor; and
a first drive assembly and a second drive assembly operably coupled to the at least one power take off member of the agricultural vehicle; and
at least one additional section pivotally coupled to one of the lateral ends of the center section and operably coupled to the first drive assembly and the second drive assembly, the at least one additional section including:
a conveyor that is selectively coupled with the center conveyor and driven by the actuator of the center section;
a first cross shaft; and
a second cross shaft,
wherein the at least one additional section is selectively pivotable between an operational position and a nonoperational position,
wherein the center section is configured to harvest a crop material in both of the operational position and the nonoperational position of the at least one additional section, and
wherein the first drive assembly is configured for driving the first cross shaft, and the second drive assembly is configured for driving the second cross shaft.

2. The agricultural vehicle according to claim 1, wherein the first drive assembly includes:
a first drive line operably coupled to the at least one power take off member;
a first transmission operably coupled to the first drive line and located at one of the lateral ends of the center section;
a second drive line operably coupled to the first transmission;
a second transmission operably coupled to the second drive line and located in between the lateral ends of the center section; and
a cross shaft operably coupled to the second transmission.

3. The agricultural vehicle according to claim 2, wherein the center section further includes a plurality of row units operably connected to the cross shaft of the first drive assembly.

4. The agricultural vehicle according to claim 2, wherein the at least one additional section further includes a plurality of row units operably connected to the first cross shaft of the at least one additional section.

5. The agricultural vehicle according to claim 4, wherein the first cross shaft of the at least one additional section is configured to engage with the cross shaft of the first drive assembly in the operational position of the at least one additional section, and the first cross shaft of the at least one additional section is configured to disengage with the cross shaft of the first drive assembly in the nonoperational position of the at least one additional section.

6. The agricultural vehicle according to claim 1, wherein the second drive assembly includes:
   a first drive line operably coupled to the at least one power take off member;
   a first transmission operably coupled to the first drive line and located at one of the lateral ends of the center section;
   a second drive line operably coupled to the first transmission;
   a second transmission operably coupled to the second drive line and located in between the lateral ends of the center section; and
   a cross shaft operably coupled to the second transmission.

7. The agricultural vehicle according to claim 6, wherein the center section further includes a plurality of choppers operably connected to the cross shaft of the second drive assembly.

8. The agricultural vehicle according to claim 6, wherein the at least one additional section further includes a plurality of choppers operably connected to the second cross shaft of the at least one additional section.

9. A folding header for harvesting a crop material, comprising:
   a center section including a pair of lateral ends, a center conveyor and an actuator driving the center conveyor, and at least two drive assemblies; and
   at least one additional section pivotally coupled to one of the lateral ends of the center section and operably coupled to the at least two drive assemblies, the at least one additional section including:
      a conveyor that is selectively coupled with the center conveyor and driven by the actuator of the center section, the at least one additional section selectively pivotable between an operational position and a nonoperational position;
      a first cross shaft; and
      a second cross shaft,
   wherein the center section is configured to harvest a crop material in both of the operational position and the nonoperational position of the at least one additional section, and
   wherein the at least two drive assemblies are configured for respectively driving the first cross shaft and the second cross shaft of the at least one additional section.

10. The folding header according to claim 9, wherein one of the at least two drive assemblies includes:
    a first drive line configured to operably couple to a power take off member of an agricultural vehicle;
    a first transmission operably coupled to the first drive line and located at one of the lateral ends of the center section;
    a second drive line operably coupled to the first transmission;
    a second transmission operably coupled to the second drive line and located in between the lateral ends of the center section; and
    a cross shaft operably coupled to the second transmission.

11. The folding header according to claim 10, wherein the center section further includes a plurality of row units operably connected to the cross shaft of the one of the at least two drive assemblies.

12. The folding header according to claim 10, wherein the at least one additional section further includes a plurality of row units operably connected to the first cross shaft of the at least one additional section.

13. The folding header according to claim 12, wherein the first cross shaft of the at least one additional section is configured to engage with the cross shaft of the one of the at least two drive assemblies in the operational position of the at least one additional section, and the first cross shaft of the at least one additional section is configured to disengage with the cross shaft of the one of the at least two drive assemblies in the nonoperational position of the at least one additional section.

14. The folding header according to claim 9, wherein another of the at least two drive assemblies includes:
    a first drive line configured to operably couple to a power take off member of an agricultural vehicle;
    a first transmission operably coupled to the first drive line and located at one of the lateral ends of the center section;
    a second drive line operably coupled to the first transmission;
    a second transmission operably coupled to the second drive line and located in between the lateral ends of the center section; and
    a cross shaft operably coupled to the second transmission.

15. The folding header according to claim 14, wherein the center section further includes a plurality of choppers connected to the cross shaft of the other of the at least two drive assemblies.

16. The folding header according to claim 14, wherein the at least one additional section further includes a plurality of choppers operably connected to the second cross shaft of the at least one additional section.

* * * * *